A. SANBORN.
SULKY PLOW.

No. 261,176. Patented July 18, 1882.

Witnesses,
Joel Nourse
Edwin A. Hildreth

Inventor,
Augustus Sanborn

UNITED STATES PATENT OFFICE.

AUGUSTUS SANBORN, OF BARRE, ASSIGNOR OF ONE-HALF TO JOEL NOURSE, OF BOSTON, MASSACHUSETTS.

SULKY-PLOW.

SPECIFICATION forming part of Letters Patent No. 261,176, dated July 18, 1882.

Application filed February 11, 1880.

*To all whom it may concern:*

Be it known that I, AUGUSTUS SANBORN, of Barre, in the county of Worcester and State of Massachusetts, have invented a new and useful Improvement in Sulky-Plows, of which the following is a specification.

Heretofore sulky-plows have usually been constructed on the principle of a common land-side plow.

Plows known as "swivel" or "reversible" plows have had serious obstacles to prevent them from being practicably applied to sulky or riding plows. The reason is obvious—that it would be entirely impracticable for the operator while riding upon the carriage of a sulky-plow to undertake in any way to reverse the moldboard of an ordinary swivel-plow. Should the operator leave his seat to reverse the moldboard at the end of each furrow, it would put him to so much extra trouble that it would be considered impracticable. The common swivel-plow of ordinary construction is not capable of being used to advantage in a sulky-plow.

The object of my invention is to provide a sulky-plow having all the advantages and doing the work of an ordinary swivel-plow. My improved sulky-plow is constructed to turn a furrow to the right-hand side while being driven in one direction, and to turn a furrow to the left-hand side while being driven in the opposite direction, allowing the operator, while in the seat and riding upon the carriage of the sulky-plow, to reverse the plows from right to left, or vice versa; also, in so constructing the sulky-plow that the carriage-wheels can be both raised and lowered on each side of the main carriage-frame to correspond with the change of plows from right to left or left to right; also, in so constructing the details of my improved sulky-plow as to more especially adapt the machine for the work required as more fully set forth in the following specification and claims.

Figure 1:
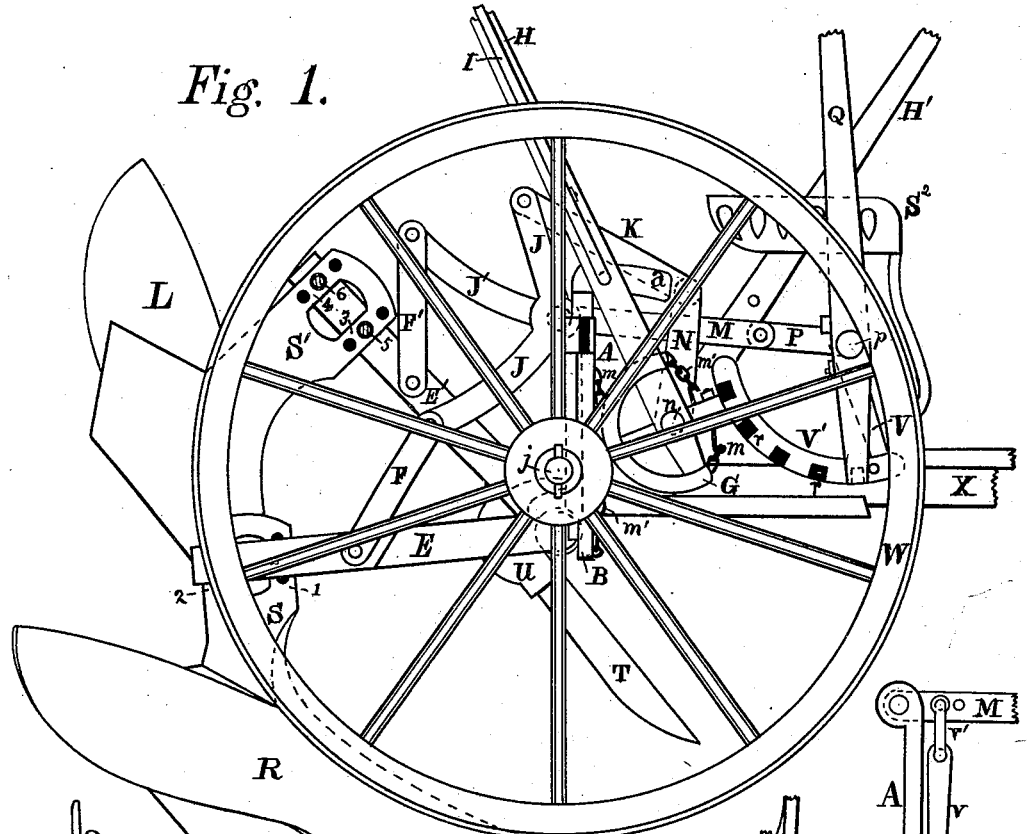
Figures 2, 3, 4:
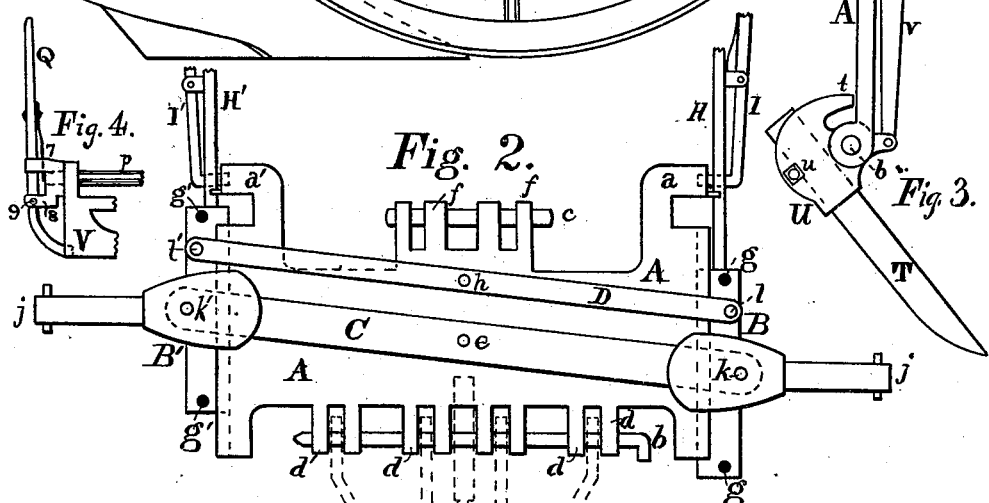

In the accompanying drawings, in which similar letters of reference indicate like parts, Figure 1 is a side view of a sulky-plow embodying my invention. Fig. 2 is a partial rear elevation, showing the main frame of the carriage of my improved sulky-plow and the mechanism for holding and raising and lowering the main axles of the carrying-wheels; also, in same figure, showing the main arms or plow-beams which hold and draw the plows, these parts being revolved into a vertical plane and represented by dotted lines. Fig. 3 shows the colter or cutter and its attachment to the sulky-frame, with device for raising the colter when driving upon the road. Fig. 4 is a partial front view, showing only the handle-lever Q and connecting parts forming the device for securing the lever Q in its various positions.

A represents the main carriage-frame, to which the plow-beams, wheel-axles, pole-seat, and all the operating-levers are connected.

E represents the beam of the right-hand plow R, stiffened or braced upon the side by a brace, $e'$, the pivot-shaft $b$ passing through lugs in the main frame A and through the forward end of the plow-beam E and brace $e'$.

$E'$ and $e''$ represent the beam and brace of the left hand plow L. The plows R and L are secured to the beams E and $E'$ by standards S and $S'$. The standards S and $S'$ are formed above the plows with a double or divided arm, having a series of holes in each arm. A bolt passes through each arm of the standard to bolt the standard to the plow-beam. These holes through the arms of the standard are shown upon standard S by numbers 1 and 2, and upon standard $S'$ by numbers 4 and 6 and 3 and 5. This double arm of the standard—each bolted to the plow-beam, the one near the rear end of the plow-beam and one arm well advanced on the plow-beam—gives a very strong and rigid support to the plow to resist the heavy strain of the work. The series of bolt-holes formed at different heights upon the standard gives an opportunity for raising and lowering the plows upon the beam to plow deeper or shallower furrows, as may be desired. It is of especial importance that there should be no give or yield when the standard is attached to the plow-beam, as any yielding here would throw the plow out of its proper working position.

To give additional strength and firmness, I form a flange, $w$ and $w'$, upon the rear end of each plow-beam E and $E'$, against which the standards S $S'$ rest, and are thereby more firmly secured in position and prevented from yielding under the heavy strain of the work.

When the plow R is in position to turn a furrow, as shown in Fig. 1, it is held in position by a connecting-bar, F, extending from the central portion of the beam E to the angular lever J J, which is supported and turns upon a pivot, c, in lugs f f upon the main frame A, as shown in Figs. 1 and 2. The lever J J is in turn connected by a link or bar, K, extending to the arm N, which is rigidly secured to the shaft n, and turns forward and back as the shaft n is revolved. The lever H is in turn rigidly secured to the shaft n, and is held in position by the catch-lever I, the lower end of which passes through the lever H and catches into a recess formed in the wing a of the main frame. When the handle H is secured in position, as shown in Fig. 1, the right-hand plow R is, by the above described connecting levers and arms, held rigidly in position to turn a furrow. Whenever the handle H is released and pressed forward by the operator, which can be accomplished by the operator while riding in the seat $S^2$, the plow R will be raised from the ground and elevated so far from the ground that it will be entirely out of the way of the left-hand plow, which will have been lowered into working position, where it will in turn be held by the lever H' and its connecting parts.

The wheels W W, of equal size, are placed upon axles j j upon each side of the carriage-frame. The axles j j are formed rigidly upon sliding plates B B'. The sliding plates B B' are constructed to slide up and down vertically in grooves formed in each side of the main frame A.

Parallel bars or connecting-axles C D are pivoted to the main frame A by pivots e h. (See Fig. 2.) These parallel bars or connecting-axles are also pivoted to the sliding plate B by pivots k l, and to sliding plate B' by pivots k' l'. By this device the parallel bars or cross-axles C D secure the sliding plates B B' into the vertical grooves formed on both sides of the main frame. Whenever the sliding plate B and attached axle j are elevated the sliding plate B' and attached axle j will be correspondingly lowered, one axle being raised just as much as the other is lowered. When the sliding plate B and axle are lowered the opposite axle will be raised. The axles j j are always securely held in their proper relative positions and in horizontal lines by the parallel connecting-bars C D.

The sliding plate B is provided with recesses g g at each end, (see Fig. 2,) through which chains m m' (see Fig. 1) are secured to the sliding plate. The chain m extends from the upper end of the sliding plate B around under the segment G, and is secured to the lever H, as shown in Fig. 1. The chain m' extends from the lower end of the sliding plate B over the segment G, and is also secured to the lever H, as shown in Fig. 1.

The segment G is formed rigidly upon the lower end of the lever H and turns with the lever. Thus whenever the lever H is rocked front or back the chains m m' will raise or lower the sliding plate B in the groove in which it slides in the main frame A. It will now readily be seen that whenever the handle H is thrown forward it will accomplish two results simultaneously—viz., the plow R will be raised from the ground by the connecting-levers N, K, J, and F, and by the segment G and chains m m' the sliding plate B and axle j will be raised at the same time.

The plow R is formed to turn a furrow to the right-hand side. The plow L is formed to turn a furrow to the left-hand side. When driving in one direction the plow R will be used. When reaching the end of the furrow the team can be turned around and driven back along the furrow just turned, the left-hand plow L being now lowered to turn the furrow in the required direction by the side of the furrow formed while passing in the opposite direction.

The left-hand plow L is connected by a series of levers exactly the duplicates of those used with the plow R, connecting the plow with a corresponding handle, H', placed on the left-hand side of the carriage. The left-hand handle H' is also provided with a segment, G, and chains m m', exactly similar to those upon the right-hand side of the plow-carriage. Thus whenever the handle H' on the left-hand side of the carriage is thrown forward the plow L will be raised and the sliding plate B' and axle j attached will be raised at the same time. The handle H' is secured in position by catch-lever I' and wing a' from the main frame, as shown in Fig. 2. When the lever H' is thrown back and secured by catch-lever I' the plow L will be held down in working position, and the left-hand axle j will also be held down in its proper working position.

In a sulky-plow it is necessary to have one wheel lower than the other, so as to run in the furrow last made, while the opposite wheel runs higher, so as to roll upon the unplowed land, holding the carriage in a horizontal position. If, first, a right-hand plow and then a left-hand plow is used, the right-hand wheel will at first require to be lowered, and when the left hand plow is used the right-hand wheel must be raised and the left-hand wheel correspondingly lowered. The wheels are raised and lowered automatically in my improved reversible sulky-plow whenever the plows are reversed.

The colter or cutter T is placed between the two plows, and answers as a cutter for both the right and left hand plows. The cutter T is secured in a head-piece, U, by a bolt, u, and the head-piece is secured in position upon the pivot b, secured in lugs on the main frame, as shown in Figs. 2 and 3. The knife or cutter is held firmly in its working position by a projection, t, which extends upward against the rear face of the main frame A. (See Fig. 3.)

Whenever it is desired to drive with the plow from place to place the levers H H' are each set with the catch-levers I I' just in front of the forward ends of the wings a a'. In this position the plows R and L will stand at equal distances from the ground, and in this position the sulky-plow can be turned at the end of the furrow; but neither plow will be as high from the ground as would be desirable in driving any long distance.

To raise the plows both high above the ground in a convenient position for driving upon the road, I provide additional means for rocking the main frame forward, as follows: I provide a lever, Q, rigidly secured to a shaft, p, said shaft turning freely in boxes formed upon the standard V. (See Fig. 4.) The standard V is secured to the pole X, which is in turn secured to the pivot b, passing through lugs in the lower portion of the main frame A, as shown in Figs. 1 and 2. To one end of the shaft p a head-block, 8, is secured. (See Fig. 4.) In this head-block 8 the lever Q is pivoted upon a pivot, 9, and plays between jaws or side guides in the upper part of the head-block. A spring, 7, is secured to the handle Q, resting against the head-block 8, and pressing the lower curved end of the lever Q against a circular rack, V', formed on the standard V. (See Figs. 4 and 1.) In the circular rack V', Fig. 1, notches r r are provided, into which the end of the lever Q is forced by the spring 7, holding the lever Q in any desired position.

The shaft p is provided at the inner end of said shaft with an arm, P, (see Fig. 1,) formed at a right angle to the shaft p and rigidly secured thereto. A connecting-arm, M, extends from the arm P to the pivot c in the lugs in the upper part of the main frame A. (See Figs. 1 and 3.) Whenever the handle Q is rocked forward the shaft p will be revolved. the inner end of the arm P will be raised, and the arm M will be drawn forward. This will revolve the main frame A forward upon the main axles, and will raise both plows to a considerable distance from the ground. At the same time, by means of the connecting-links v v', (see Fig. 3,) the cutter-knife or colter will be raised to a considerable distance from the ground by the action of the arm M. In this position my improved sulky-plow is ready to be trundled from place to place or driven upon the road.

Having thus described the nature, construction, and operation of my invention, what I claim as new, and desire to secure by Letters Patent, is—

1. The combination of the two centrally-pivoted parallel bars C and D, connecting the axles j j, raising one as the other is lowered, and holding the axles in their horizontal positions, substantially as described.

2. The combination of the hand-lever H with connections for operating or raising and lowering both the right and left hand plows and for operating both of the main supporting-wheels, by means of which one plow is raised while the other is lowered, one of the wheels by the same operation being automatically raised and the other lowered, and vice versa, substantially as described, and for the purpose specified.

3. The combination of the right and left hand plows with the primary hand-lever H, by means of which either plow can be raised from the furrow and the other plow inserted into the ground, and by means of which both right and left hand plows can be raised slightly from the ground, and the secondary hand-lever, Q, with its connecting-arms, by means of which both plows can be raised together still farther from the ground for transportation from place to place, substantially as and for the purpose described.

4. The combination of the lever H, segment G, chains m m', vertically-adjustable axle-support B, and axle j, for raising and lowering the wheel W upon the main frame A, substantially as described.

5. The pivoted cutter T, hinged upon pivot b, in combination with connecting-link v and levers M and P, for raising the cutter when both plows are raised by the lever Q, substantially as described, and for the purpose specified.

AUGUSTUS SANBORN.

Witnesses:
HOMER W. HITCHCOCK,
CHAS. C. AMES.